J. H. LONGENECKER.
GATE LATCH.
APPLICATION FILED DEC. 8, 1915.
1,183,575.
Patented May 16, 1916.
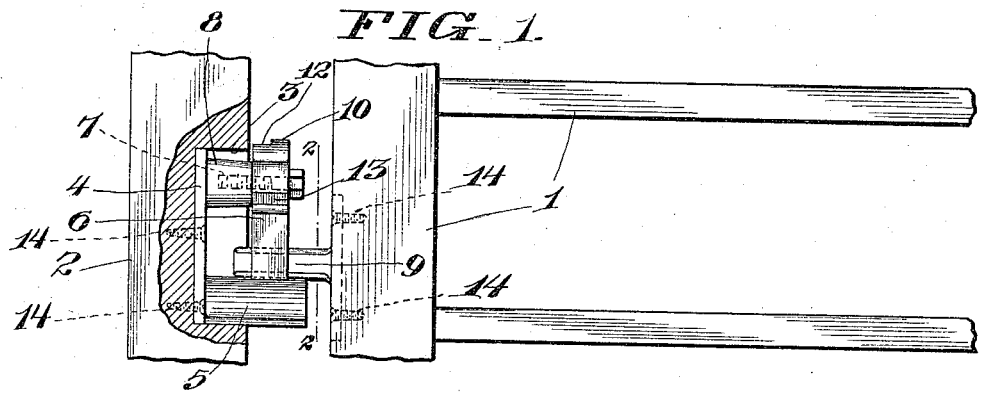
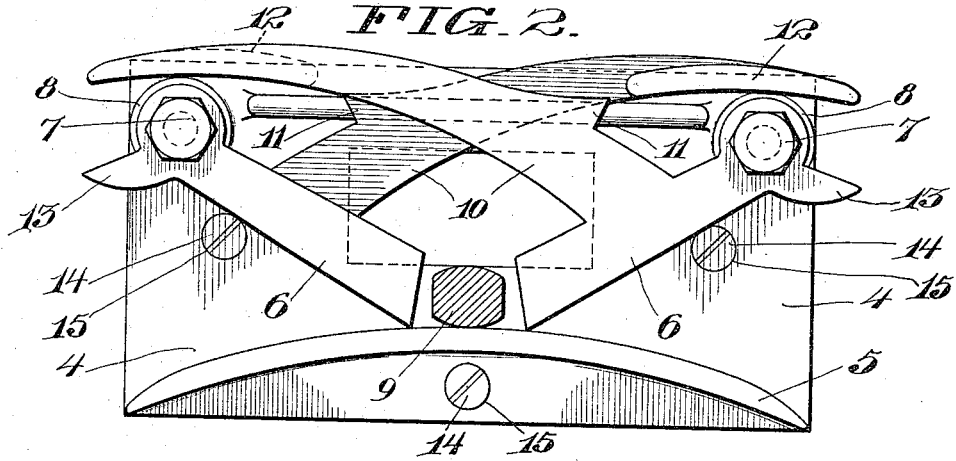
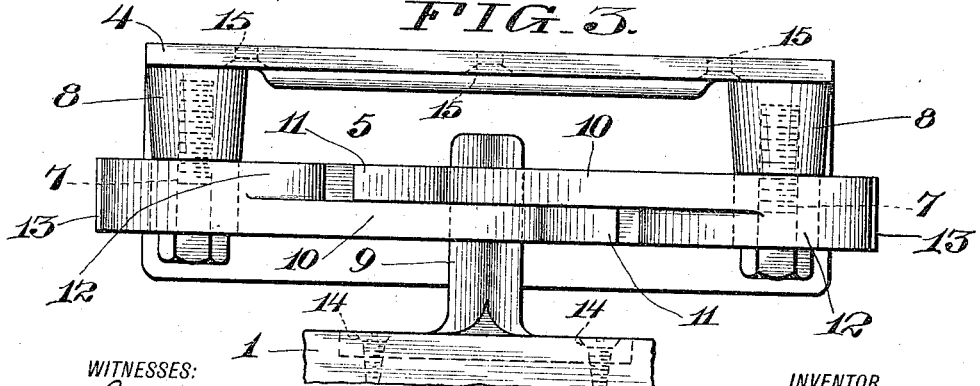
WITNESSES:
INVENTOR
Jacob H. Longenecker,
BY Joshua R. H. Potts.
HIS ATTORNEY.

UNITED STATES PATENT OFFICE.

JACOB H. LONGENECKER, OF PALMYRA, PENNSYLVANIA.

GATE-LATCH.

1,183,575.

Specification of Letters Patent.

Patented May 16, 1916.

Application filed December 8, 1915. Serial No. 65,727.

*To all whom it may concern:*

Be it known that I, JACOB H. LONGENECKER, a citizen of the United States, residing at Palmyra, in the county of Lebanon and State of Pennsylvania, have invented certain new and useful Improvements in Gate-Latches, of which the following is a specification.

My invention relates to improvements in gate latches, the object of the invention being to provide an improved construction and arrangement of latched dogs which, when assembled on the base plate, have a certain amount of independent movement sufficient for all ordinary operation, and which is so constructed as to limit the pivotal movement and prevent the latch dogs from being moved to an inoperative position.

A further object is to provide a gate latch which is comparatively simple in construction, strong and durable in use.

With these and other objects in view, the invention consists in certain novel features of construction and combinations and arrangements of parts as will be more fully hereinafter described and pointed out in the claims.

In the accompanying drawings: Figure 1 is a fragmentary view in elevation showing the gate post partly in section. Fig. 2 is an enlarged view in section on the line 2—2 of Fig. 1, the gate post being omitted, and Fig. 3 is an enlarged plan view of Fig. 1.

1 represents a gate of the type adapted to swing in both directions, and 2 is a stationary gate post. My improved latch is secured to the post 2, and is preferably countersunk in a recess 3 in the post as shown clearly in Fig. 1.

The latch comprises a base plate 4 having a curved guide flange 5 integral therewith and projecting from the same adjacent its lower portion.

6, 6, represent pivoted latch dogs which are precisely alike and which are pivotally supported on bolts 7 screwed into studs 8 integral with base plate 4. The dogs 6 are normally located at an incline with their free ends resting upon the flange 5 so as to receive between them a rigid pin 9 fixed to the free end of gate 1. The pin 9 rides into locked position from either side of the latch and in such movement causes one of the dogs 6 to elevate and then fall into locked position behind the pin.

The curved flange 5 supports the weight of the gate at its free end and prevents sagging. The pivoted latch dogs 6 are provided with curved arms 10 crossing each other, and operating as weights to hold the dogs in operative position.

The arms 10 are provided on their upper edges with shoulders 11, and on their side faces adjacent their free ends with laterally projecting flanges 12. The pivotal movement of one dog is limited by the shoulder 11 thereon engaging the flange 12 of the other dog, hence it is impossible for the dogs to be thrown out of operative position and accidental displacement is rendered impossible.

The dogs 6 are provided adjacent their pivots with fingers 13, which permit the dogs to be manually operated to release pin 9 whenever desired, and it will be noted that the latch dogs 6 are spaced at their free ends sufficient for all necessary operative purposes. I preferably countersink the latch in the post 2 as far as convenient in order to reduce the space between the post and the gate, and I preferably use screws 14 as a securing medium for the base plate 4, said screws projected through openings 15 in the base plate and screwed into the post.

The arms 10 on the latch dog 6 are narrower than the dogs, so that while they cross each other, they occupy a combined width approximately the same as the width of each dog, and all of the parts are strongly made and capable of the rough usage to which they are necessarily subjected.

Various slight changes might be made in the general form and arrangement of part described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A gate latch, comprising a base plate having a gate pin supporting flange thereon, a pair of latch dogs of substantially similar construction pivotally connected to the plate and having their free ends resting on the flange, and arms projecting from said dogs, each of said arms crossing the other, each of said arms having a portion designed to be engaged by the other arm whereby the extent of movement of said dogs is limited, substantially as described.

2. A gate latch, comprising a base plate having a gate pin supporting flange thereon, a pair of pivoted latch dogs connected to the plate and having their free ends resting on the flange, each dog having an integral arm thereon, the arms of the dogs crossing each other, each arm having a shoulder and a flange, the flange of each dog engaged by the shoulder of the other dog limiting the independent pivotal movement of the dogs, substantially as described.

3. A gate latch, comprising a base plate having a gate pin supporting flange thereon, a pair of pivoted latch dogs connected to the plate and having their free ends resting on the flange, said dogs having integral curved arms thereon, the arm of one dog crossing the arm of the other dog, each arm having a shoulder at its upper edge, and having a laterally projecting flange at its free end, the flange of one dog engaged by the shoulder of the other dog limiting the pivotal movement of the dog in one direction, substantially as described.

4. A gate latch, comprising a base plate having a gate pin supporting flange thereon, a pair of latch dogs of substantially similar construction pivotally connected to the plate and having their free ends resting on the flange, and arms projecting from said dogs, each of said arms crossing the other, each of said arms having a laterally projecting flange for engagement with the other arm whereby the extent of movement of said dog is limited, substantially as described.

In testimony whereof I have signed my name to this specification in the presence of two subscribing witnesses.

JACOB H. LONGENECKER.

Witnesses:
  S. N. FASNACHT,
  ALVIN S. BOWMAN.